(12) United States Patent
Ezagui

(10) Patent No.: US 12,056,732 B2
(45) Date of Patent: *Aug. 6, 2024

(54) SYSTEM AND METHOD FOR LOCATION-BASED SECURED TRANSFER OF A SERVICE ASSOCIATED WITH A LOYALTY POINT BETWEEN MOBILE DEVICES

(71) Applicant: SIMTIK INC., Palm Beach Gardens, FL (US)

(72) Inventor: Avrohom Leib Ezagui, Palm Beach Gardens, FL (US)

(73) Assignee: Simtik Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,153

(22) Filed: Oct. 21, 2022

(65) Prior Publication Data

US 2023/0045659 A1 Feb. 9, 2023

Related U.S. Application Data

(63) Continuation of application No. 16/097,041, filed as application No. PCT/US2017/029806 on Apr. 27, 2017, now Pat. No. 11,625,744.

(Continued)

(51) Int. Cl.
*G06Q 30/00* (2023.01)
*G06Q 20/22* (2012.01)
(Continued)

(52) U.S. Cl.
CPC ....... *G06Q 30/0225* (2013.01); *G06Q 20/223* (2013.01); *G06Q 20/3224* (2013.01);
(Continued)

(58) Field of Classification Search
CPC ............. G06Q 20/223; G06Q 20/3224; G06Q 20/387; G06Q 30/0226
See application file for complete search history.

(56) References Cited

U.S. PATENT DOCUMENTS 6,424,910 B1 7/2002 Ohler et al.
8,606,293 B2 12/2013 Kim et al.
(Continued)

*Primary Examiner* — Meredith A Long
(74) *Attorney, Agent, or Firm* — Dinsmore & Shohl LLP

(57) ABSTRACT

There are provided systems and methods for the location-based secured transfer of a service associated with a loyalty point between mobile devices. A first mobile device submits a services request to a central system, the request identifying a service and inclusive of the position (geographical location) of the first mobile device. The central system identifies service providers capable of fulfilling the request and account owners having sufficient loyalty points to fulfill the request that are in proximity to the first mobile device. Secure communications between the first mobile device and a second mobile device enable negotiations. The central system guides the first mobile device and the second mobile device to a predetermined location to enable secure communication of transaction information, payment information, personal information (needed to procure services), etc. The central system verifies the transaction, ensuring both the first and second mobile devices fulfill the agreed upon terms.

17 Claims, 11 Drawing Sheets

Related U.S. Application Data

(60) Provisional application No. 62/328,213, filed on Apr. 27, 2016.

(51) Int. Cl.
*G06Q 20/32* (2012.01)
*G06Q 20/38* (2012.01)
*G06Q 30/0207* (2023.01)
*G06Q 30/0226* (2023.01)
*H04W 4/02* (2018.01)
*H04W 4/029* (2018.01)
*H04W 4/80* (2018.01)

(52) U.S. Cl.
CPC ....... *G06Q 20/387* (2013.01); *G06Q 30/0207* (2013.01); *G06Q 30/0226* (2013.01); *H04W 4/023* (2013.01); *H04W 4/029* (2018.02); *H04W 4/80* (2018.02)

(56) References Cited

U.S. PATENT DOCUMENTS

| | | |
|---|---|---|
| 9,014,963 B1 | 4/2015 | Kolton et al. |
| 9,071,453 B2 | 6/2015 | Shoemaker et al. |
| 9,218,609 B2 | 12/2015 | Hertel et al. |
| 11,625,744 B2 * | 4/2023 | Ezagui .......... H04W 4/02 705/14.27 |
| 2001/0054006 A1 | 12/2001 | Lee et al. |
| 2002/0143614 A1 | 10/2002 | MacLean et al. |
| 2010/0250360 A1 | 9/2010 | Ball et al. |
| 2011/0004558 A1 * | 1/2011 | MacLean .......... G06Q 50/188 705/80 |
| 2013/0030887 A1 | 1/2013 | Calman et al. |
| 2014/0006253 A1 | 1/2014 | Nuzzi et al. |
| 2015/0073987 A1 | 3/2015 | Dutt |

* cited by examiner

SYSTEM AND METHOD FOR LOCATION-BASED SECURED TRANSFER OF A SERVICE ASSOCIATED WITH A LOYALTY POINT BETWEEN MOBILE DEVICES

CROSS-REFERENCE TO RELATED APPLICATIONS

This application is a continuation of U.S. patent application Ser. No. 16/097,041, filed Oct. 26, 2018 titled SYSTEM AND METHOD FOR LOCATION-BASED SECURED TRANSFER OF A SERVICE ASSOCIATED WITH A LOYALTY POINT BETWEEN MOBILE DEVICES, which is a 371 application of PCT Ser. No. PCT/US17/29806 filed on Apr. 27, 2017 titled SYSTEM AND METHOD FOR LOCATION-BASED SECURED TRANSFER OF A SERVICE ASSOCIATED WITH A LOYALTY POINT BETWEEN MOBILE DEVICES, which claims priority to U.S. Provisional Patent Application Ser. No. 62/328,213, filed Apr. 27, 2016 titled SYSTEM AND METHOD FOR LOCATION-BASED SECURED TRANSFER OF A SERVICE ASSOCIATED WITH A LOYALTY POINT BETWEEN MOBILE DEVICES, the entire disclosures of which are incorporated by reference herein.

BACKGROUND

In general, loyalty currencies issued by airlines, credit card companies, and the like, are not currencies in the general sense, but rather are akin to camp scrip or bartering for services. For example, airline miles are a guarantee of services, rather than having purchasing power in their own right. The traveler surrenders a set number of miles, regardless of how those miles are earned, in exchange for a service provided by the airline, i.e., a flight.

Every year, approximately 60 billion dollars in loyalty currencies go unredeemed. The causes for this vary, from users unaware that points or miles expire, to the inability to use the points or miles for desired purchases/services. Several loyalty currencies prohibit the buying and selling of the currency among users, or using the currency for third parties, thereby maintaining a high degree of control over the value thereof. Other currency issuers enact many rules regarding the usage of currencies making it very difficult to redeem for anything of value. Additionally, point issuers generally provide limited categories of services to use points with.

Despite this, it is not uncommon for users to utilize their loyalty currency for the benefit of another. For example, a traveler may secure an airline ticket for another using miles. Generally, airlines do not prohibit this provided it is actually the owner of the miles doing the purchase. This is problematic for the user who desires to acquire a service using such loyalty currency, but lacks a sufficient amount of the loyalty currency to do so. Some of the currency issuers sell their currencies, however the price is generally set by the issuer, without regard to market factors.

Due to the restrictions placed on use of loyalty currencies, it is increasingly difficult to transfer such currencies between users. To overcome this type of restriction, various entities facilitate exchanges between individuals. These entities, however, typically have a relationship with the currency issuer, thus resulting in both users being disadvantaged in favor of the entity and the issuer. It would be desirous to have a system and method that allows users to exchange currencies without the restrictions placed by the issuers.

A user may acquire loyalty currencies via use of credit cards and other rewards programs, independent of the loyalty currency issuer, e.g., airlines. In these instances, airlines sell at an undisclosed price, a large number of miles to the credit card companies, which in turn offer these miles as a reward for use of the credit card. These miles, in general, are infrequently used, resulting in a loss for the user, but a gain for the airline and the credit card companies. It would be beneficial to those users acquiring such miles to be able to transfer them to such other users that may have a need for such miles.

The problems in utilizing these loyalty currencies are typically a user may not need the specific services or products being offered by the point's issuer. They may also lack the knowledge to navigate complicated redemption rules set forth by the point's issuers and service providers. Additionally, they may not have sufficient amount of the needed currency to procure a service. Acquiring additional currencies may involve contacting the issuer and purchasing additional miles at a cost that is set by the issuer. It would be advantageous to provide a system and method that enables users to acquire additional amounts of loyalty currency from users that are not using theirs or desire to sell theirs. However, as discussed above, these loyalty currencies are generally non-transferable. Further, it is difficult to identify those users with sufficient currency amounts by the user desiring to purchase such currency. Instead, the user with the currency must exchange the currency for the service needed by the requesting user. This requires some mechanism to securely connect the two users, ensuring their respective privacy while also ensuring that the buyer receives the service and the seller receives compensation. Further, there is no mechanism in place to determine a suitable exchange rate between various loyalty currencies and other currencies, real or otherwise. By creating a large network of users this would allow the users to find and exchange their points for services they really need at the going rate.

What is needed is a secure system and method that enables the unrestricted exchange of digital data between users corresponding to restricted loyalty currencies.

Being that the point's value can fluctuate based on supply and demand, season, or value of the service provided, each sale is tracked and contributes into that currencies average price.

SUMMARY

According to one embodiment, there is provided a system for transferring a service associated with a loyalty point to a first user device from a second user device. The system includes a server that comprises a processor, and memory in communication with the processor. The memory stores instructions which are executed by the processor and which cause the processor to receive a request from a first user device over a communications network, the request including first user identification information and a service request, and identify at least one service provider accepting a loyalty point for fulfilling the service request. The instructions further cause the processor to identify at least one second user device associated with a second user identification, the second user identification having sufficient loyalty points to procure the requested service from the at least one identified service provider, and establish a secure communications link between the first user device and the at least one identified second user device, wherein the loyalty points associated with the second user identification are utilized to procure the requested service from the at least one identified service provider for the first user identification.

According to another aspect, there is provided a method for transferring a service associated with a loyalty point to a first user device from a second user device. The method includes receiving a request via a web site hosted by a server over a communications network, the request including first user identification information and a service request, and identifying at least one service provider accepting a loyalty point for fulfilling the service request. The method further includes establishing a secure communications link between the first user device associated with the first user identification and a second user device associated with a second user identification, the second user identification having sufficient loyalty points to procure the requested service from the at least one identified service provider, and utilizing, in accordance with the secured communications link, the loyalty points by the second user identification via the second user device to procure the requested service for use by the first user identification. In addition, the method includes communicating, via the secured communications link, confirmation data indicative of the procurement of the requested service from the second user device to the first user device.

In accordance with another aspect, there is provided a system implementing the method described above.

In accordance with yet another aspect, there is provided a computer-readable medium storing instructions, which when executed by a computer processor, perform the method described above.

In accordance with still another aspect, there is provided a system and method wherein a first user may utilize loyalty points to facilitate a purchase at a fixed location.

In accordance with yet another aspect, there is provided a system and method for transferring a service associated with multiple loyalty points to a first user device from one or more additional user devices.

DETAILED DESCRIPTION

Figure 1A:
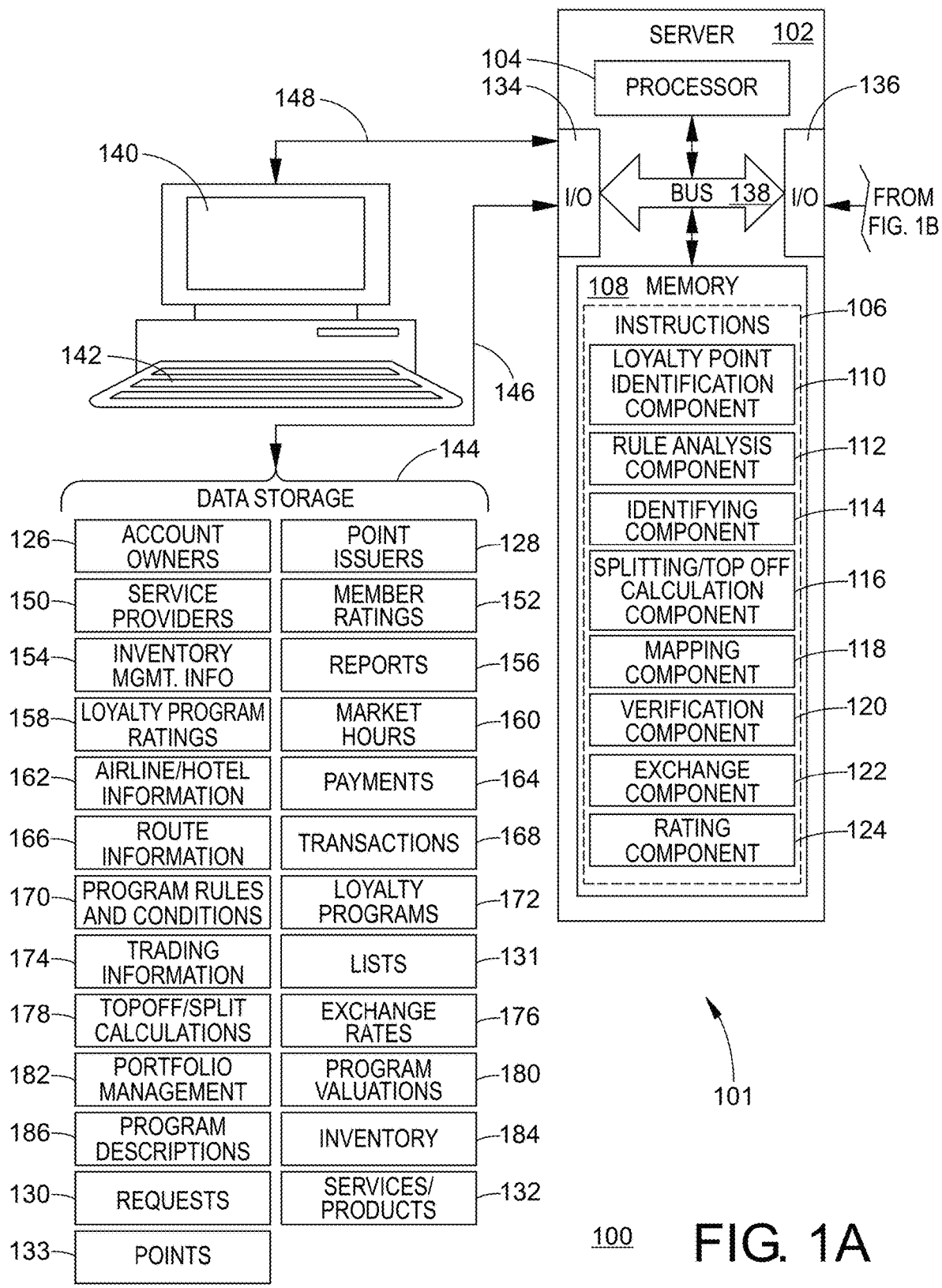
FIGS. 1A-1B are a functional block diagram of a system for location-based secured transfer of a service associated with a loyalty point between mobile devices in accordance with one aspect of the exemplary embodiment.

One or more embodiments will now be described with reference to the attached drawings, wherein like reference numerals are used to refer to like elements throughout. Aspects of exemplary embodiments related to systems and methods for location-based secured transfer of a service associated with a loyalty point between mobile devices are described herein. In addition, example embodiments are presented hereinafter referring to mobile devices, however, application of the systems and methods set forth can be made in other areas, as will be appreciated by those skilled in the art.

As briefly discussed above, there are provided systems and methods to location-based secured transfer of a service associated with a loyalty point between mobile devices to enable a first mobile device (i.e., a buyer device) to locate a second mobile device (i.e., a local points owner or service provider) through global positioning system ("GPS") and/or WIFI signals capable of servicing a request from the first mobile device. Buyer makes a payment to the point owner and the points owner provides the requested service/products. The points owner can in turn purchase another service from another user in the network with the funds he received in his virtual account thus allowing him to exchange his points for a service provided by another loyalty points issuer. Such a network increases the likelihood of finding a useful service and products with points. It also allows users to pay for services to anyone who wants to accept the virtual network currency as payment, by first exchanging the points they hold for cash, similar to transacting with a credit card.

Figure 1B:
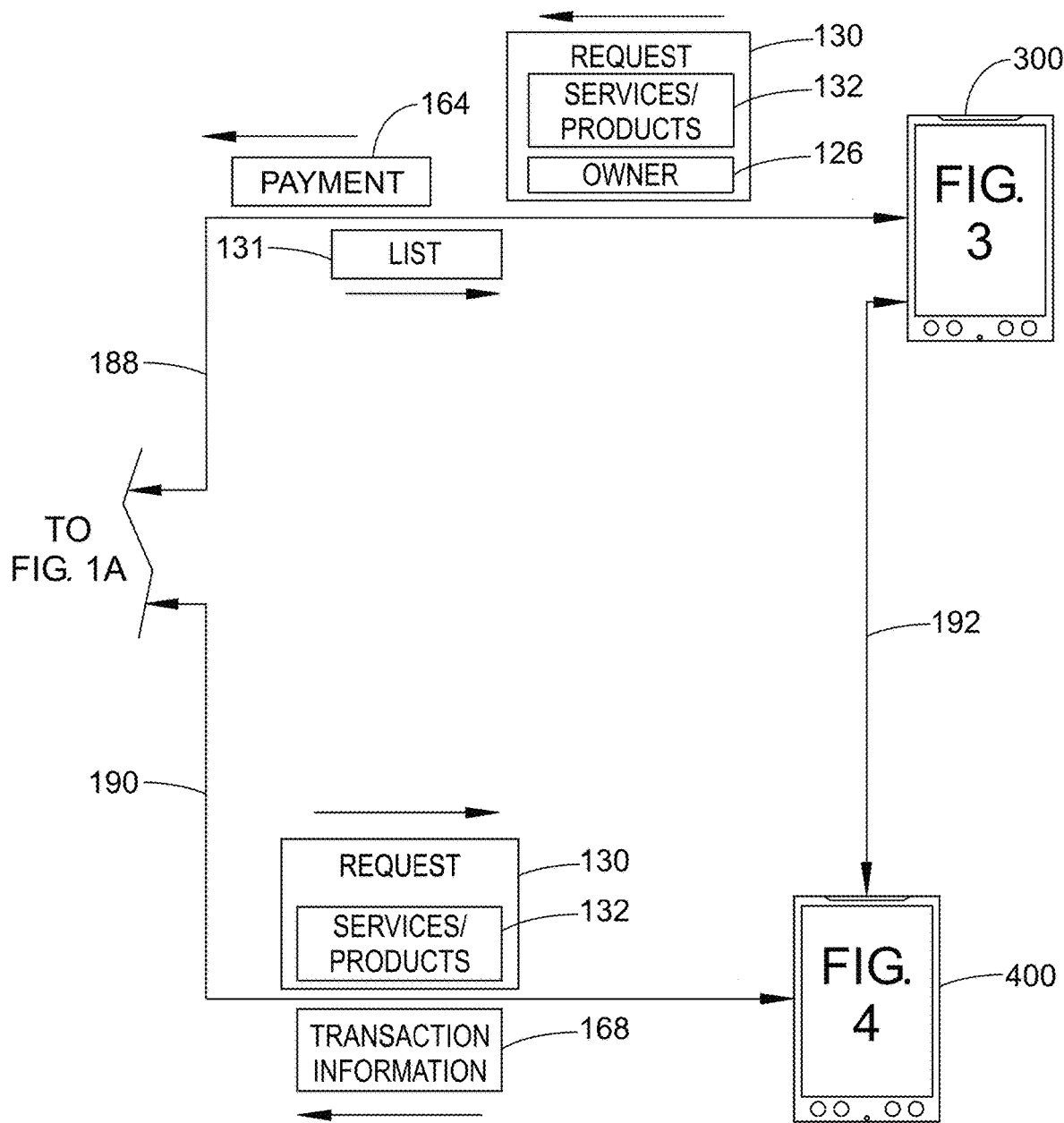

With reference to FIGS. 1A-1B, there is shown a location-based secured transfer of a service associated with a loyalty point between mobile devices system 100 configured for providing secure exchange of information between mobile devices and preventing fraud related thereto. It will be appreciated that the various components depicted in FIGS. 1A-1B are for purposes of illustrating aspects of the exemplary embodiment, and that other similar components, implemented via hardware, software, or a combination thereof, are capable of being substituted therein.

As shown in FIGS. 1A-1B, the system 100 includes a central system 101 represented generally as the server 102, which is capable of implementing the exemplary method described below. The exemplary server 102 includes a processor 104, which performs the exemplary method by execution of processing instructions 106 that are stored in memory 108 connected to the processor 104, as well as controlling the overall operation of the server 102.

The instructions 106 include a loyalty point identification component 110 that identifies loyalty point programs 172 that corresponded to a received request 130 that specifies a particular good or service, e.g., a hotel room, an airline flight, a cup of coffee, etc. It will be appreciated that myriad loyalty programs are known in the industry, allowing for rewards to those customers utilizing the underlying service or purchasing goods from particular points issuers 128, e.g., stores, airlines, hotels, car rental companies, restaurants, and the like.

The instructions 106 may also include a rule analysis component 112 that is configured to determine the rules 170 governing the loyalty points programs 172 identified by the identification component 110. In accordance with some embodiments contemplated herein, the analysis component 112 is configured to determine whether the service/product 132 contained in the request 130 is capable of being fulfilled by the identified loyalty points programs 172. For example, some loyalty points programs 172 do not allow for the sale/transfer of points 133, some require certain conditions be met, some have blackout dates wherein redemption of points 133 is not allowed, and myriad other restrictions on points 133 being used.

The instructions 106 may further include an identifying component 114 that searches for accounts 126 of users and identifies those accounts 126 with points 133 corresponding to the identified loyalty point programs 172.

The instructions 106 may also utilize a splitting/topoff calculation component 116 that is configured to identify the various combinations of transactions 168 that will result in a sufficient number of loyalty points 133 to fulfill the request 130. In some embodiments, the calculation component 116 may work in conjunction with the identifying component 114 to identify those accounts 126 that may have sufficient points 133 to combine or meet the requirements of the request 130. For example, the calculation component 116 may identify, with the identifying component 114, a plurality of accounts 126 that, while separately do not have sufficient points 133 to fulfill the request 130, may together provide sufficient loyalty points 133. Additionally, the calculation component 116 may be configured to calculate the costs associated with splitting an account 126, i.e., only utilizing a portion of the points 133 in the account 126. In some instances, it may be cost effective to purchase only a small percentage of the available points 133 in a particular account 126 and repeat this for multiple accounts 126 to acquire sufficient loyalty points 133 to fulfill the request 130.

The instructions 106 in memory 108 may also include a mapping component 118 configured to receive location data, e.g., GPS coordinates, addresses, WiFi location information, IP address information, and the like, from disparate devices 300 and 400.

In addition, the instructions 106 may include a verification component 120 configured to verify transactions 168 between user accounts 126. In accordance with one embodiment, the verification component 122 is configured to monitor transactions 168 submitted by the first mobile device 300 or communicated by the second mobile device 400 corresponding to the exchange of loyalty points 133 therebetween. The verification component 122 may output results to the rating component 124, whereupon the rating component 124 utilizes these results in ranking and rating account owners 126, loyalty programs 172, valuations 180, and the like. It will be appreciated that other actions may be undertaken and performed by the verification component 122 with respect to the transactions 168 including, for example and without limitation, escrowing payments, rectifying transfers, establishing secure communications with devices 300, 400, establishing secure communications with loyalty programs 172, verifying confirmation information, and the like.

The instructions 106 stored in memory 108 may also utilize an exchange component 122 configured to track all transactions 168 between buyers and sellers (i.e., account owners 126, service providers 150, etc.), including any monetary values 180 associated therewith. The exchange component 122 may further be configured to generate exchange rates 176 for loyalty points 133 in accordance with the aforementioned transactions 168. In one embodiment, the exchange rates 176 are stored in the data storage 144 (discussed below) and provided to the first mobile device 300 (i.e., the buyer), the second mobile device 400 (i.e., the seller/service provider 126, 150 upon login or request to the server 102) for use during negotiations, setting prices of loyalty points 133, and the like. In such an embodiment, the exchange rates 176 may be tied to an intermediate point, wherein the servicer 102 tracks, in real time, multiple service transfers amongst users utilizing a varying loyalty points 133 relative to the aforementioned intermediate point. The exchange component 122 may then determined, from this tracking, the exchange rate(s) 176 relating each of the various loyalty points to the intermediate point. In further implementations, the amounts of loyalty points 133 needed for services may be determined relative to the intermediate point using the determined exchange rate 176. It will be appreciated that this information may be forwarded to the disparate devices 300 and 400 for generation on the respective associated display, including, for example and without limitation, graphical indicia representative of each loyalty point relative to the intermediate point.

Furthermore, the instructions 106 may utilize a rating component 124 configured to collect user ratings 152, relating to transactions 168 to which a particular user was involved. The rating component 124 may further be configured to rate various loyalty programs 172, loyalty program points issuers 128, rules 170, and the like. In some embodiments, the ratings 152, 158 output by the rating component 124 are presented to users during transactions, searches, and the like. It will be appreciated that other uses of ratings 152 and 158 may also be contemplated and utilized hereinafter. In some embodiments, the ratings 152, 158 are presented in conjunction with lists of user accounts 126 on a first mobile device 300 in response to a request 130 for services.

The various components of the server 102 associated with the central system 101 may all be connected by a data/control bus 138. The processor 104 of the server 102 is in communication with an associated data storage 144 via a link 146. A suitable communications link 146 may include, for example, the public switched telephone network, an Internet connection, a proprietary communications network, infrared, optical, or other suitable wired or wireless data communications. The data storage 144 is capable of implementation on components of the server 102, e.g., stored in local memory 108, i.e., on hard drives, virtual drives, or the like, or on remote memory accessible to the computer system 102. Various components depicted in the data storage 144 may also be accessible by the server 102 via third party service providers, e.g., airline servers, publicly accessible websites, proprietary databases, and the like, Accordingly, it will be appreciated that in some embodiments, the associated data storage 144 corresponds to any organized collections of data used for one or more purposes. Implementation of the associated data storage 144 may occur on any mass storage device(s), for example, magnetic storage drives, a hard disk drive, optical storage devices, flash memory devices, or a suitable combination thereof.

The associated data storage 144 may be implemented as a component of the server 102, e.g., resident in memory 108, hosted by third parties, or the like.

In one embodiment, the associated data storage 144 may include data corresponding to account owners (users/members) 126, points issuers 128, service providers (sellers/businesses/may be points issuer 128 as well, etc.) 150, member ratings 152, inventory management information 154, reports 156, loyalty program ratings 158, market hours 160, payments 164, airline/hotel information 162, route information 166, loyalty programs 172, loyalty program rules and conditions 170, loyalty program trading information 174, splitting/topoff calculations 178, exchange rates 176, portfolio management information 182, loyalty program valuations 180, inventory 184, partner options, loyalty program descriptions 186, requests 130, lists 131, points 133, services/products 132, and the like.

The server 102 may include one or more input/output (I/O) interface devices 134 and 136 for communicating with external devices. The I/O interface 134 may communicate, via communications link 148, with one or more of a display device 140, for displaying information, such estimated destinations, and a user input device 142, such as a keyboard or touch or writable screen, for inputting text, and/or a cursor control device, such as mouse, trackball, or the like, for communicating user input information and command selections to the processor 104.

It will be appreciated that the system 100 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIGS. 1A-1B as a networked set of components, the system and method are capable of implementation on a stand-alone device adapted to perform the methods described herein.

The server 102 may include a computer server, workstation, personal computer, cellular telephone, tablet computer, pager, combination thereof, or other computing device capable of executing instructions for performing the exemplary method.

According to one example embodiment, the server 102 includes hardware, software, and/or any suitable combination thereof, configured to interact with an associated user, a networked device, networked storage, remote devices, or the like.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 134, 136 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIGS. 5-8.

The system 100 illustrated in FIGS. 1A-1B may include a first mobile device 300 that may be in intermittent communication with the central system 101 via a communication link 188. In one embodiment, the first mobile device 300 may be implemented as a smartphone employing an operating system such as iOS, ANDROID, BLACKBERRY, WINDOWS, or the like. Such first mobile device 300 may include a thin client 322 operable to interact with the server 102, access a web page hosted by the server 102, display data received from the server 102, and the like. In another embodiment, an application 320 may be resident on the first mobile device 300, as discussed below, and configured to enable the aforementioned interaction with the server 102. The first mobile device 300 is representative of any personal computing devices, such as personal computers, netbook computers, laptop computers, workstation computers, personal data assistants, web-enabled cellular telephones, tablet computers, proprietary network devices, or other web-enabled electronic devices. The data communications link 188 between the central system 101 and the first mobile device 300 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications. In one embodiment, the first mobile device 300 may communicate with the central system 101 via a cellular data network. It will be appreciated that the first mobile device 300 need not maintain a constant connection to the central system 101.

Figure 2:
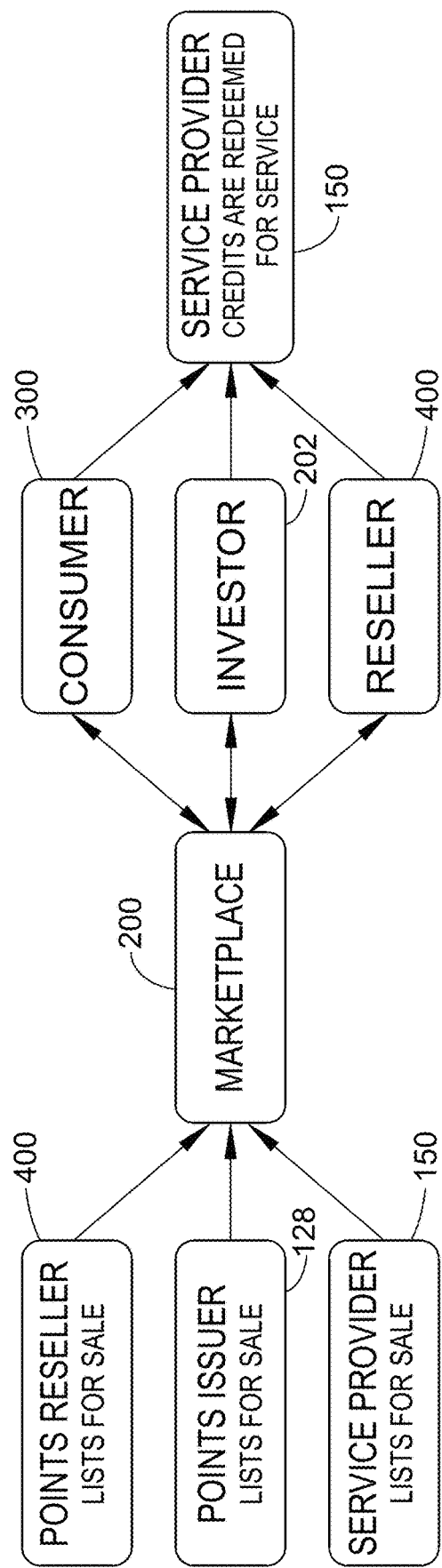
FIG. 2 is a block diagram of the system for location-based secured transfer of a service associated with a loyalty point between mobile devices in accordance with one aspect of the exemplary embodiment.

Turning now to FIG. 2, there is shown an overview of a system in accordance with one embodiment of the subject application. As shown in FIG. 2, which simulates operations with respect to FIGS. 1A-1B, a marketplace 200, representative of a website hosted by the server 102, is shown in communication with a plurality of devices. A points reseller, i.e., a seller utilizing a second mobile device 400 (discussed below), a points issuer 128, and service provider 150 (which may be associated with the second mobile device 400) communicate/list points 133 for sale on the marketplace 200. Consumers, i.e., a first mobile device 300 (discussed below), investors 202 (non-users of points 133), and sellers (second mobile device 400) each interact between the marketplace 200 (representative of the server 102 facilitating the transactions 168 between devices 300 and 400) and service providers 150 (entities providing goods/services 132 in exchange for loyalty points 133). FIG. 9 provides an illustration of a graphical user interface via which a user interacts with the marketplace 200 in accordance with one aspect of the exemplary embodiments discussed herein. Operations of the systems 100, 200 depicted in FIGS. 1A-2 will be better understood in conjunction with FIGS. 5-8 discussed below.

Figure 3:
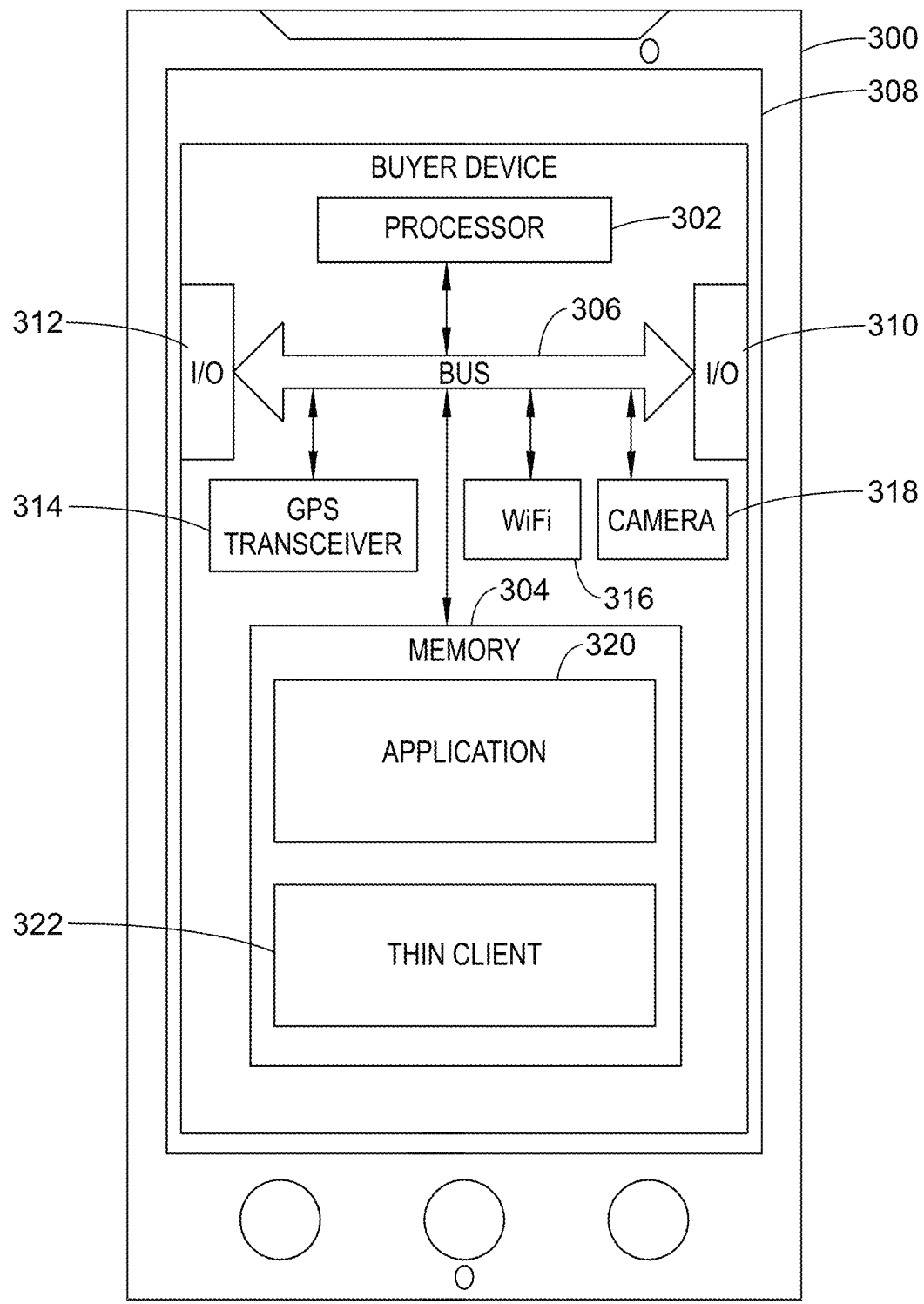
FIG. 3 is a functional block diagram of a first mobile device used in the system for location-based secured transfer of a service associated with a loyalty point in accordance with one aspect of the exemplary embodiment.

FIG. 3 provides an example illustration of a mobile device 300 representative of the first mobile device 300 depicted in FIGS. 1A-1B. The first mobile device 300 may include a processor 302, which executes one or more instructions or applications 320 in the performance of an exemplary method discussed below. The processor 302 may also execute a thin client 322, operable to interact with a website hosted by the server 102 and accessible via the Internet. The first mobile device 300 may further include a memory 304 storing the application 320 and thin client 322 in data communication with the processor 302 via a system bus 306. The processor 302 of the first mobile device 300 may be in data communication with the server 102 of the central system 101 via an I/O interface 312. In one embodiment, the I/O interface 310 is implemented as a short-range communication component, such as, for example an NFC component. In such an embodiment, the I/O interface 310 may be configured to receive information from a second mobile device 400, the information corresponding to transaction details during the exchange of loyalty points 133 therebetween. In other embodiments, the short range communication component may be implemented using any suitable short range communications protocol, and the use of NFC protocols is for example purposes only. The first mobile device 300 may further include a display 308 suitably configured to display data to an associated user, receive input from the associated user, and the like. In some embodiments, the display 308 of the first mobile device 300 may be configured as a touch-screen display capable of receiving user instructions via user contact on the display, e.g., LCD, AMOLED, LED, RETINA, etc., types of touch-screen displays. In other embodiments, the first mobile device 300 may include a camera 318, operable to capture images, such as QR codes or other graphical/textual indicia associated with a transaction and generated on a screen 308 of the second mobile device 400. According to such an embodiment, the processor 302 may process the captured image and determine the transaction details 168 therefrom via the application 320, thin client 322, or other process.

The memory 304 may represent any type of non-transitory computer readable medium such as random access memory (RAM), read only memory (ROM), magnetic disk or tape, optical disk, flash memory, or holographic memory. In one embodiment, the memory 304 comprises a combination of random access memory and read only memory. In some embodiments, the processor 302 and memory 304 may be combined in a single chip. The network interface(s) 310, 312 allow the user device 300 to communicate with other devices via a communications network, and may comprise a modulator/demodulator (MODEM). Memory 304 may store data the processed in the method as well as the instructions for performing the exemplary method. The digital processor 302 can be variously embodied, such as by a single core processor, a dual core processor (or more generally by a multiple core processor), a digital processor and cooperating math coprocessor, a digital controller, or the like.

The memory 304 of the first mobile device 300 includes the application 320 communicated from the central system 101 during registration of the user device 300. The application 320 stored in memory 304 may include account information or other data related to interactions with the server 102, the marketplace 200, and/or the second mobile device 400.

As shown in FIGS. 1A-1B, the first mobile device 300 is capable of intermittent or continuous bi-directional communication with the server 102 utilizing the I/O interface 312. In one embodiment, the bi-direction communication is data communication utilizing a cellular data network, e.g., $3^{rd}$ generation mobile phone standards (3G), $4^{th}$ generation standards (4G, 4G LTE, WiMax), EV-DO, standalone data protocols, and the like. The first mobile device 300 may provide account information to the server 102 during registration therewith, login information during transactions 168, payment information 164, and the like. During registration, the server 102 may communicate the application 320 to the first mobile device 300. The first mobile device 300, via the processor 302, may then install the application 320 in memory 304.

The first mobile device 300 may further include a GPS transceiver 314 operable to utilize satellite navigation signals from to determine the position of the device 300. The device 300 may further include a WiFi transceiver 316, e.g., 802.11x, for communications as well as assistance in determining the position of the mobile device 300 utilizing base station/access point coordinates, triangulation (in conjunction with cellular tower information), Internet Protocol (IP) address information, or the like. Preferably, the location information of the first mobile device 300 is communicated with the request 130 to the server 102, as discussed in greater detail below. In addition, it will be appreciated that the components 314 and 316 may be utilized during mapping operations of the mapping component 118 of the server 102 to facilitate the meeting of the first mobile device 300 with the second mobile device 400, as addressed below.

Figure 4:
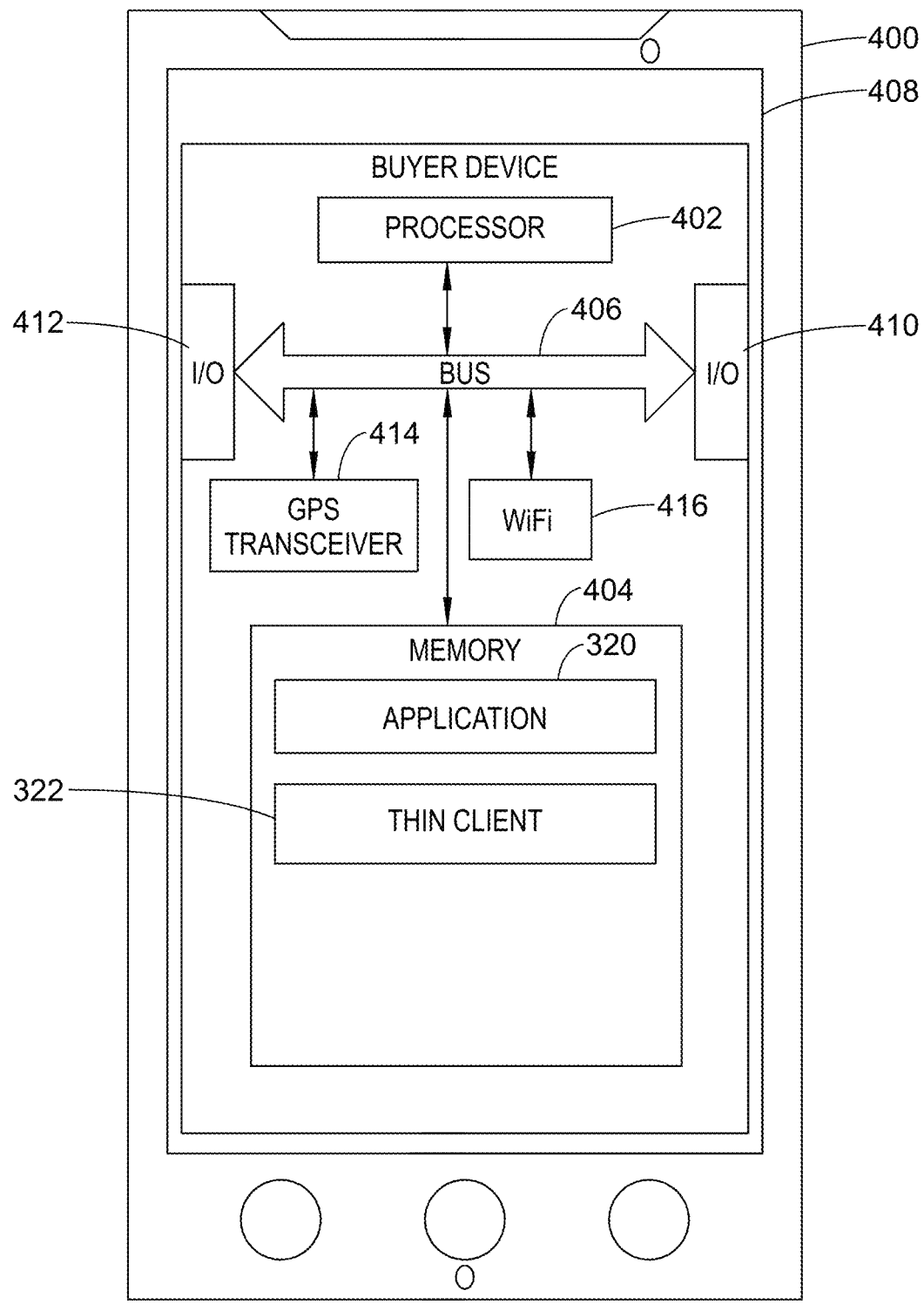
FIG. 4 is a functional block diagram of a control device used in the system for location-based secured transfer of a service associated with a loyalty point in accordance with one aspect of the exemplary embodiment.

The system 100 illustrated in FIGS. 1A-1B further includes at least one additional device, depicted therein as a second mobile device 400 capable of data communication with the server 102 and the first mobile device 300. It will be appreciated that while shown as a mobile device in FIG. 4, the second device may be implemented as a fixed (i.e., point-of-sale terminal, desktop computer, server, etc.) device at a particular location, e.g., store, restaurant, airport counter, ticketing agency, etc. Those skilled in the art will appreciated that when fixed, the various location-based determinations provided below (particularly with respect to FIGS. 5-8) may utilize that fixed position relative to the first mobile device 300 for purposes of determining suitable account owners 126 to facilitate the transfer of loyalty points 133, utilize the fixed position as the meeting location, and the like. A functional block diagram of the second mobile device 400 is depicted in FIG. 4. As shown in FIG. 4, the second mobile device 400 may include a processor 402, which executes one or more instructions or the application 320 in the performance of an exemplary method discussed below. In one embodiment, the second mobile device 400, via the processor 402, is configured to operate a thin client 322, which facilitates communication between the second mobile device 400 and the server 102 via the Internet. The second mobile device 400 may further include a memory 404 storing the application 320 and/or thin client 322 in data communication with the processor 402 via a system bus 406. The processor 402 of the second mobile device 400 may be in data communication with the server 102 via an I/O interface 410 and the first mobile device 300 via an I/O interface 412. In one embodiment, the I/O interface 412 is implemented as a short-range communication component, such as, for example an NFC component. In such an embodiment, the short-range communication component may be implemented using any suitable short-range communications protocol, and the use of NFC protocols is for example purposes only. The second mobile device 400 may further include a display 408 suitably configured to display data to an associated controller, receive input from the controller, and the like. In some embodiments, the display 408 of the second mobile device 400 may be configured as a touch-screen display capable of receiving user instructions via user contact on the display, e.g., LCD, AMOLED, LED, RETINA, etc., types of touch-screen displays. In another embodiment, the display 408 of the second mobile device 400 may be configured to generate a QR code or other graphical/textual indicia of a transaction 168 for scanning/image capture by a first mobile device 300.

The memory 404 may represent any type of non-transitory computer readable medium such as random access memory (RAM), read only memory (ROM), magnetic disk or tape, optical disk, flash memory, or holographic memory. The memory 404 may include a combination of random access memory and read only memory. In some embodiments, the processor 402 and memory 404 may be combined in a single chip. The network interface(s) 410, 412 allow the second mobile device 400 to communicate with other devices via a communications network, and may comprise a modulator/demodulator (MODEM). Memory 404 may store data the processed in the method as well as the instructions for performing the exemplary method. The processor 402 can be variously embodied, such as by a single core processor, a dual core processor (or more generally by a multiple core processor), a digital processor and cooperating math coprocessor, a digital controller, or the like.

The memory 404 of the second mobile device 400 includes the application 320 communicated from the central system 101 during registration of the second mobile device 400. The application 320 stored in memory 404 may include account information or other data related to interactions with the server 102, the marketplace 200, and/or the first mobile device 300.

As shown in FIGS. 1A-1B, the second mobile device 400 is capable of intermittent or continuous bi-directional communication with the central system 101 utilizing the I/O interface 410. As indicated above with respect to the first mobile device 300, the bi-direction communication is data communication utilizing a cellular data network. In some embodiments, the second mobile device 400 and the first mobile device 300 may establish a short-range communication session, e.g., an NFC connection, whereupon the applications 320 direct the respective devices to exchange data to facilitate a transaction 168.

The second mobile device 400 may further include a GPS transceiver 414 operable to utilize satellite navigation signals from to determine the position of the device 400. The second mobile device 400 may further include a WiFi transceiver 416, e.g., 802.11x, for communications as well as assistance in determining the position of the second mobile device 400 utilizing base station/access point coordinates, triangulation (in conjunction with cellular tower information), Internet Protocol (IP) address information, or the like. Preferably, the location information of the second mobile device 400 is communicated to the server 102 during acceptance of the transaction 168 and with the transaction information 168 communicated thereto, as discussed in greater detail below. In addition, it will be appreciated that the components 414 and 416 may be utilized during mapping operations of the mapping component 118 of the server 102 to facilitate the meeting of the first mobile device 300 with the second mobile device 400, as addressed below.

According to one embodiment, the second mobile device 400 may be implemented as a point-of-sale ("POS") terminal or desktop computer physically located at a retailer, restaurant or other service/goods providing location. In such an embodiment, it will be appreciated that the first mobile device 300 may utilize loyalty points 133 (as discussed herein) to facilitate the purchase of goods/services at the physical location of the second device 400. Furthermore, the relative location of the first mobile device 300 relative to the second mobile device 400 may be used by the second mobile device 400, as the POS, to increase the number of loyalty points 133 accorded to the first mobile device 300, or decrease the number of loyalty points 133 needed to procure the services as a result of the relative origin proximity of the first mobile device 300. That is, when the first mobile device 300 is already at the service/goods providing location, the aforementioned benefit is accorded to the first mobile device 300.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
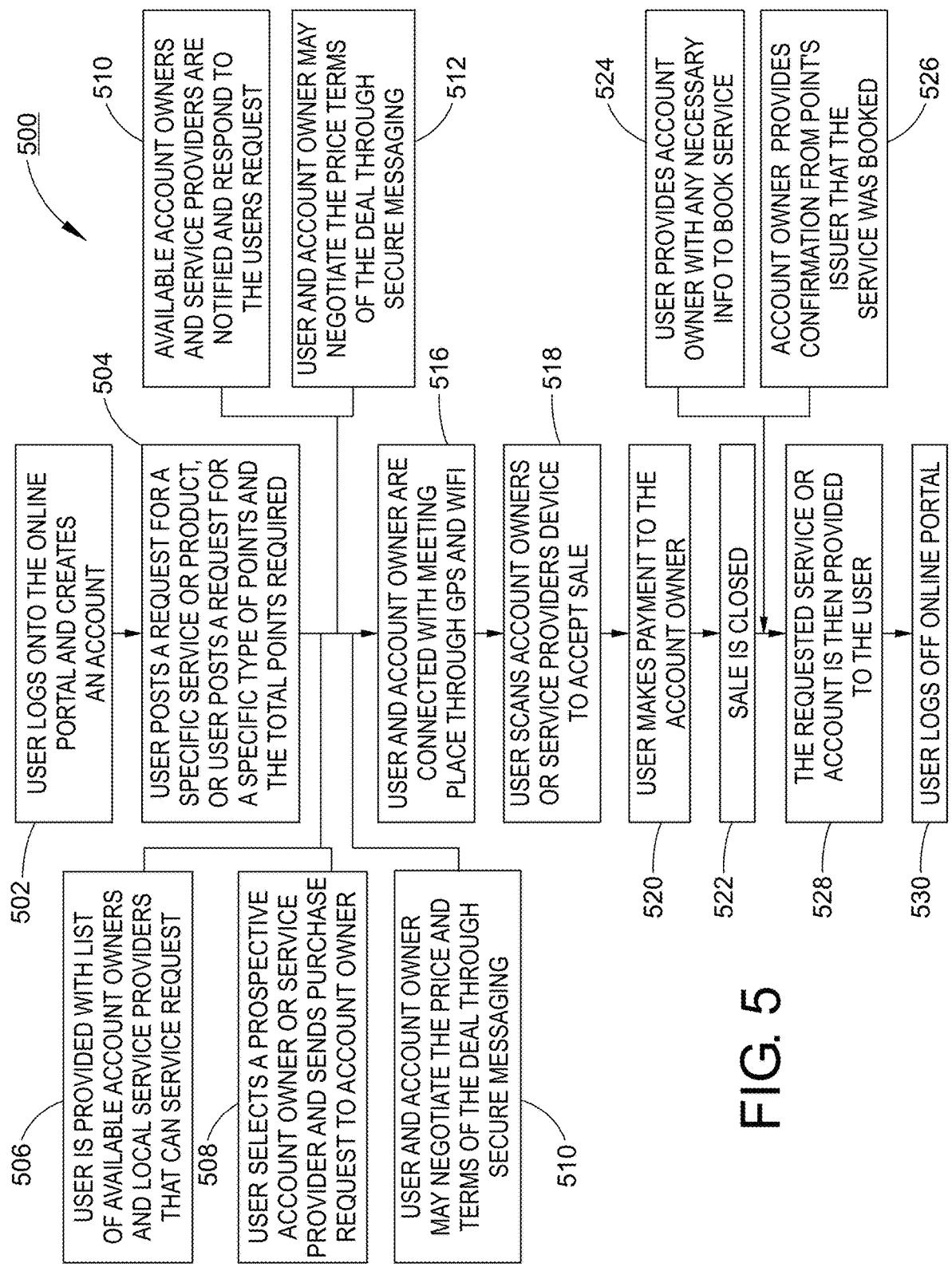
FIG. 5 is a flowchart illustrating a method for location-based secured transfer of a service associated with a loyalty point between mobile devices according to a first mobile device in accordance with one aspect of the exemplary embodiment.

Turning now to FIG. 5, there is shown an exemplary flowchart 500 illustrating one example implementation of the methods described herein with respect to the first mobile device 300, i.e., the buyer device 300. As depicted in FIG. 5, the first mobile device 300, at 502, accesses a web site 200 hosted by the server 102 to create a user account 126 stored on the associated data storage 144. In accordance with one embodiment of the subject application, the first mobile device 300 communicates user identification information along with location information determined by the processor 302 via the GPS transceiver 314 and/or WiFi transceiver 316.

At 504, a user, via the user interface 308 of the first mobile device 300 submits a request 130 to the server 102 via the communications link 188 for a specific product/service 132, or for a specific type/form of loyalty points 133 and a total number of such loyalty points 133 required. At 506, the first mobile device 300 receives and displays a list 131 of available account owners 126 and local service providers 150 that are capable of fulfilling the request 130. It will be appreciated that the list 131 communicated from the server 102 to the first mobile device 300 is determined in accordance with the location information included by the first mobile device 300 in the submitted services request 130. For example, the first mobile device 300 includes the coordinates from the GPS transceiver 314 or IP address from the WiFi transceiver 316 in the request, which the server 102 utilizes to filter the account owners 126 and/or service providers 150 in the data storage 144 to those which are in relative proximity to the position of the first mobile device 300.

Figure 10:
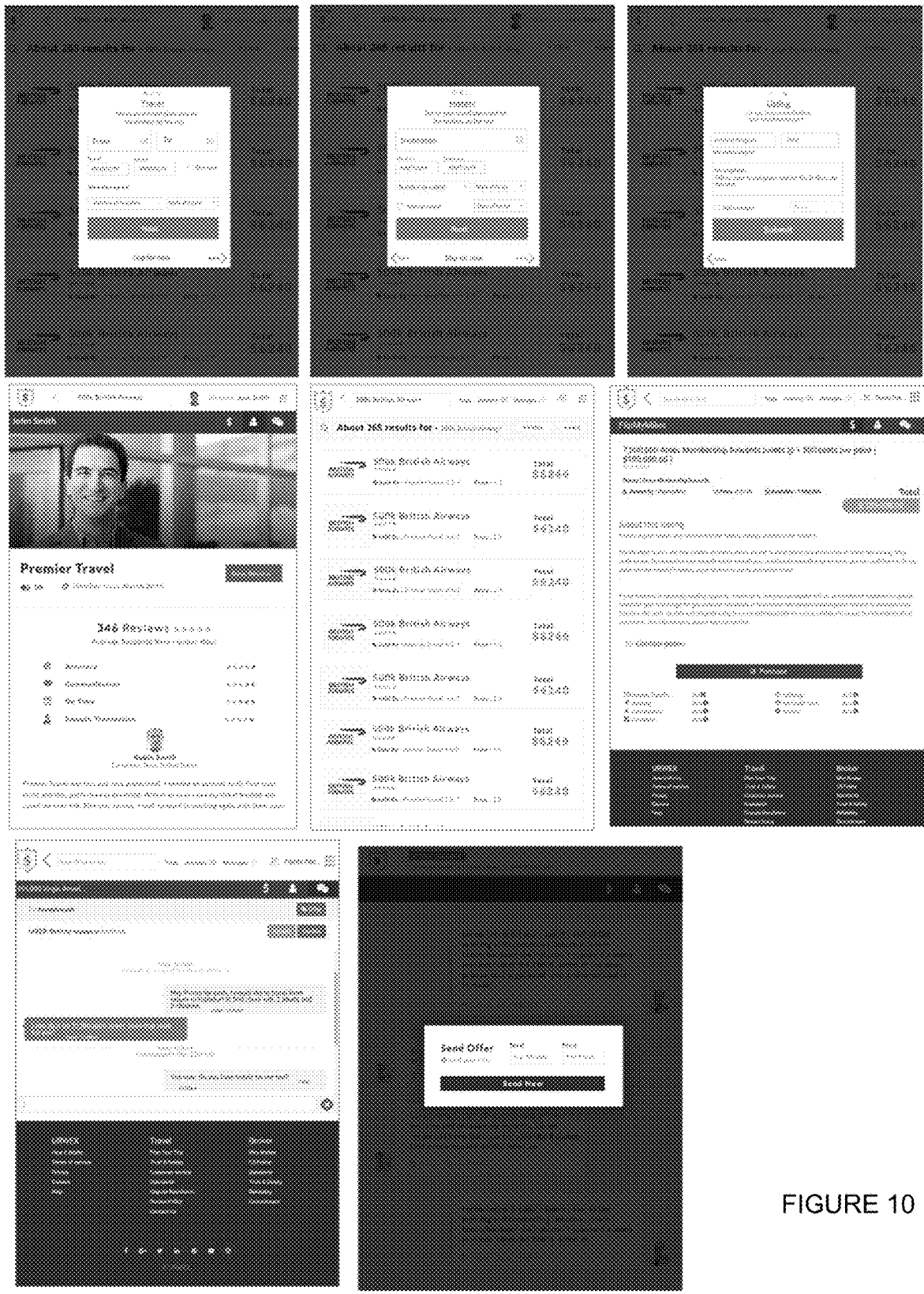
FIG. 10 provides an illustration of a graphical user interface associated with the mobile devices in accordance with an exemplary embodiment.

A selection of at least one of the account owners 126 and/or local service providers 150 from the server 102 is then received at 508 and communicated to the selected account owner(s) 126 and/or local service provider 150. At 510, the selected account owner(s) 126 and/or local service provider(s) 150 are notified via secure communications of the submitted request 130. At 512-514, the first mobile device 300 and the second mobile device 400 (either associated with the selected account owner 126 or local service provider 150) establish a secure communications link 192 therebetween. The secure communications link 192, as will be appreciated by those skilled in the art, may utilize any suitable encrypted communications protocols, direct communications protocols, or the like. Via this established secure communications link 192, the price and terms of the exchange of loyalty points may be negotiated. FIG. 10 provides an illustration of the various screens displayed on the mobile device 300, 400 in accordance with one embodiment of the subject application. It will further be appreciated that the use of local account owners 126 and/or service providers 150 provides additional levels of security to the respective parties, as both will reside in the same locales for purposes of exchanging the loyalty points 133 and completing the transaction 168.

At 516, the server 102 identifies a meeting location (using a suitable mapping application, e.g., GOOGLE Maps, APPLE Maps, MAPQUEST, etc., or a proprietary mapping application by the mapping component 118 resident on the server 102) substantially equidistant between the current location of the first mobile device 300 and the second mobile device 400. It will be understood that when a local service provider 150 is selected, the meeting location may correspond to the physical location of the second mobile device 400 (representative of the store, airport counter, etc.) of the service provider 150. In accordance with another embodiment, the users may designate a mutually agreeable location to meet, whereupon the application 320 resident on the respective mobile devices 300, 400 will generate directions from their respective current locations to the meeting location. In another embodiment, the meeting location identified by the server 102 may include a list of available public meeting places, e.g., restaurants, coffee shops, etc. Regardless of the manner in which the meeting location is selected, each mobile device 300, 400 generates step-by-step directions, maps, and/or other instructions, directing the mobile devices 300 and 400 toward each other and/or the meeting location.

In one implementation, the server 102 queries each mobile device 300, 400 for their current locations after some acceptance of the transaction 168 is indicated, and ascertains the list of suitable locations based on the relative travel times of the mobile devices 300, 400 to such locations. For example, it may be farther to travel for the first mobile device 300 to location X, but require the same amount of time that it will take the second mobile device 400 to travel to location X due to traffic, time of day, mode of travel, etc. In some instances, the users may designate their respective modes of travel (bicycle, walking, car, public transport), whereupon the server 102 queries the suitable routes and provides the list of locations in accordance therewith.

Once the first mobile device 300 and the second mobile device 400 are in relative proximity to each other, e.g., suitable for scanning an image from one device by the other or establishing an NFC connection therebetween, the second mobile device 400 (or the point of sale terminal for a fixed location service provider 150) generates details of the transaction regarding the exchange of loyalty points 133 between the users. This generation may include, for example and without limitation, a QR code, a near-field-communications message, or the like, which is scanned by or securely communicated to the first mobile device 300 at 518 for acceptance by the associated user/buyer.

From the first mobile device 300, the user/buyer accepts and renders payment for the loyalty points/services to be facilitated by the account owner 126 or service provider 150 associated with the second mobile device 400 at 520. In one embodiment, the first mobile device 300 establishes a secure communication link to the server 102 so as to provide authorization for the transfer of funds (payment 164) from the user account 126 associated with the first mobile device 300 to the user account 126 associated with the second mobile device 400. Preferably, the first mobile device 300 communicates the transaction details 168, as well as the current location of the first mobile device 300, to the server 102. The server 102 may then query the second mobile device 400 for its current location (ensuring that a valid transaction is occurring between the parties), to verify that the first mobile device 300 is actually communicating/accepting terms from a valid second mobile device 400 (i.e., account owner 126 or service provider 150).

At 522, the server 102 confirms the transaction 168, closing the sale and ensuring that the suitable funds are transferred from the buyer account owner to the seller account owner, i.e., from the account owner 126 of the first mobile device 300 to the account owner 126 of the second mobile device 400. It will be appreciated that in one embodiment, the server 102 may escrow the funds pending confirmation of the provision of services 132 to the account owner 126 of the first mobile device 300. Suitable examples of such confirmation may include, for example and without limitation, location-based tracking of the first mobile device 300 for airline loyalty point transactions/hotel stays (rectifying the location of the first mobile device 300 with a location of the hotel associated with the purchased loyalty points, etc.), receipt of confirmation information (i.e., ticket information in the name of the account owner 126 of the first mobile device 300) for ticket purchases by the account owner 126 of the second mobile device 400, or the like.

At 524, while in proximate location with each other, i.e., at the meeting location, the user associated with the first mobile device 300 provides any necessary identification information to the user associated with the second mobile device 400 needed to procure the requested service 132. The user associated with the second mobile device 400 then utilizes the loyalty points to procure the requested service (e.g., books a flight, hotel, transfers loyalty points to another account, purchases the cup of coffee (STARBUCKS REWARDS), or the like) and provides confirmation from the loyalty point issuer 128 that the service was procured, e.g., booked, at 526.

At 528, the requested service 132 or account 126 (i.e., the requested service may be the acquisition of loyalty points 133, wherein the actual account 126 in which the loyalty points 133 have accrued is transferred to the user associated with the first mobile device 300). The first mobile device 300 then logs off of the website 200 hosted by the server 102 at 530, thereby terminating operations with respect to FIG. 5.

Figure 6:
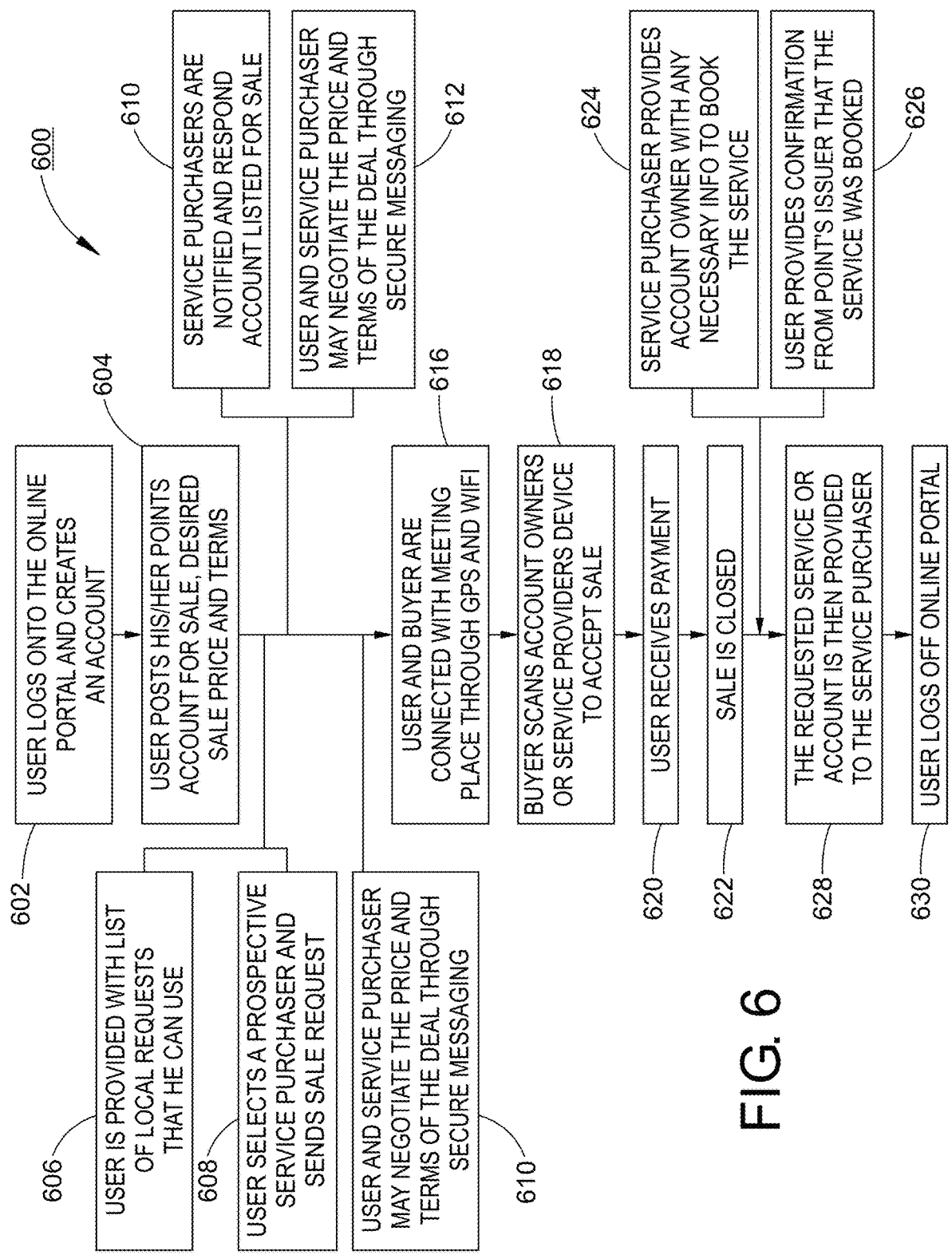
FIG. 6 is a flowchart illustrating a method for location-based secured transfer of a service associated with a loyalty point between mobile devices according to a second mobile device in accordance with one aspect of the exemplary embodiment

Referring now to FIG. 6, there is shown an exemplary flowchart 600 illustrating one example implementation of the methods described herein with respect to the second mobile device 400, i.e., the seller device 400. As depicted in FIG. 6, the second mobile device 400, at 602, accesses a web site 200 hosted by the server 102 to create a user account 126 stored on the associated data storage 144. In accordance with one embodiment of the subject application, the second mobile device 400 communicates user identification information along with location information determined by the processor 402 via the GPS transceiver 414 and/or WiFi transceiver 416.

At 604, a user, via the user interface 408 operative on the second mobile device 400, posts an available number of loyalty points 133 for sale along with the desired sale price and terms/conditions to facilitate the sale, to the server 102 via the communications link 190. For example, the seller may be selling an entire loyalty account, a set number of loyalty points 133, or variations thereof. At 606, the second mobile device 400 receives and displays a list of local services requests 130 that the account owner 126 associated with the second mobile device 400 is capable of fulfilling. It will be appreciated that the list communicated from the server 102 to the second mobile device 400 is determined in accordance with the location information communicated by the second mobile device 400 when logging onto the website 200 hosted by the server 102. For example, the second mobile device 400 includes the coordinates from the GPS transceiver 414 or IP address from the WiFi transceiver 416 during communication of login credentials, which the server 102 utilizes to filter the requests 130 the server 102 has received only to those mobile devices 300 within a predetermined location radius (relative to the location of the second mobile device 400) and which the account owner 126 associated with second mobile device 400 is capable of fulfilling.

A selection of at least one of the service requests 130 from the server 102 is then received at 608 and communicated to the selected mobile device 300 associated with the service request 130. At 610, the service requestor, i.e., the first mobile device 300 is notified via secure communications that the account owner 126 associated with the second mobile device 400 is capable of fulfilling the service request 130. At 612-614, the first mobile device 300 and the second mobile device 400 (with the selected account owner 126) establish a secure communications link therebetween. The secure communications link, as will be appreciated by those skilled in the art, may utilize any suitable encrypted communications protocols, direct communications protocols, or the like. Via this established secure communications link, the price and terms of the exchange of loyalty points may be negotiated. It will further be appreciated that the use of local account owners 126 and/or service providers 150 provides additional levels of security to the respective parties, as both will reside in the same locales for purposes of exchanging the loyalty points and completing the transaction.

At 616, the server 102 (as discussed above with respect to FIG. 5) identifies a meeting location (using a suitable mapping application) substantially equidistant between the current location of the second mobile device 400 and the first mobile device 300. It will be understood that when a local service provider 150 is associated with the second mobile device 400, the meeting location may correspond to the physical location of the second mobile device 400 (representative of the store, airport counter, etc.) of the service provider 150. In accordance with another embodiment, the users may designate a mutually agreeable location to meet, whereupon the application 320 resident on the respective mobile devices 300, 400 will generate directions from their respective current locations to the meeting location. In another embodiment, the meeting location identified by the server 102 may include a list of available public meeting places, e.g., restaurants, coffee shops, etc. Regardless of the manner in which the meeting location is selected, each mobile device 300, 400 generates step-by-step directions, maps, and/or other instructions (or receives the same from the mapping component 118 of the server 102), directing the mobile devices 300 and 400 toward each other and/or the meeting location. In one implementation, the server 102 queries each mobile device 300, 400 for their current locations after some acceptance of the transaction is indicated, and ascertains the list of suitable locations based on the relative travel times of the mobile devices 300, 400 to such locations. For example, it may be farther to travel for the first mobile device 300 to location X, but require the same amount of time that it will take the second mobile device 400 to travel to location X due to traffic, time of day, mode of travel, etc. In some instances, the users may designate their respective modes of travel (bicycle, walking, car, public transport), whereupon the server 102 queries the suitable routes and provides the list of locations in accordance therewith.

Once the first mobile device 300 and the second mobile device 400 are in relative proximity to each other, e.g., suitable for scanning an image from one device by the other or establishing an NFC connection therebetween, the second mobile device 400 (or the point of sale terminal for a fixed location service provider 150) generates details of the transaction 168 regarding the exchange of loyalty points 133 between the users at 618. This generation may include, for example and without limitation, a QR code, a near-field-communications message, or the like, which is scanned by or securely communicated to the first mobile device 300 for acceptance by the associated user/buyer.

At 620, the account owner 126 associated with the second mobile device 400 receives payment 164 from the first mobile device 300. According to varying embodiments contemplated herein, the payment 164 may be directly communicated to the second mobile device 400 by the first mobile device 300 via a suitable payment mechanism, e.g., GOOGLE WALLET, APPLE PAY, SAMSUNG, etc. In another embodiment, as discussed in detail above, the first mobile device 300 may establish a secure communication link to the server 102 so as to provide authorization for the transfer of funds from the user account associated with the first mobile device 300 to the user account associated with the second mobile device 400. Preferably, the first mobile device 300 communicates the transaction details 168, as well as the current location of the first mobile device 300, to the server 102. The server 102 may then query the second mobile device 400 for its current location (ensuring that a valid transaction 168 is occurring between the parties), to verify that the first mobile device 300 is actually communicating/accepting terms from a valid second mobile device 400 (i.e., account owner 126 or service provider 150).

At 622, the server 102 confirms the transaction, closing the sale and ensuring that the suitable funds are transferred from the buyer account owner to the seller account owner, i.e., from the account owner 126 of the first mobile device 300 to the account owner 126 of the second mobile device 400. It will be appreciated that in one embodiment, the server 102 may escrow the funds pending confirmation of the provision of services 132 to the account owner 126 of the first mobile device 300. Suitable examples of such confirmation may include, for example and without limitation, location-based tracking of the first mobile device 300 for airline loyalty point transactions/hotel stays (rectifying the location of the first mobile device 300 with a location of the hotel associated with the purchased loyalty points, etc.), receipt of confirmation information (i.e., ticket information in the name of the account owner 126 of the first mobile device 300) for ticket purchases by the account owner 126 of the second mobile device 400, or the like.

At 624, while in proximate location with each other, i.e., at the meeting location, the user associated with the first mobile device 300 provides any necessary identification information to the user associated with the second mobile device 400 needed to procure the requested service 132. The user associated with the second mobile device 400 then utilizes the loyalty points to procure the requested service 132 (e.g., books a flight, hotel, transfers loyalty points to another account, purchases the cup of coffee (STARBUCKS REWARDS), or the like) and provides confirmation from the loyalty point issuer 128 that the service 132 was procured, e.g., booked, at 626.

At 628, the requested service 132 or account (i.e., the requested service 132 may be the acquisition of loyalty points 133, wherein the actual account in which the loyalty points 133 have accrued is transferred to the user associated with the first mobile device 300). The second mobile device 400 then logs off of the website 200 hosted by the server at 630, thereby terminating operations with respect to FIG. 6.

Figure 7:
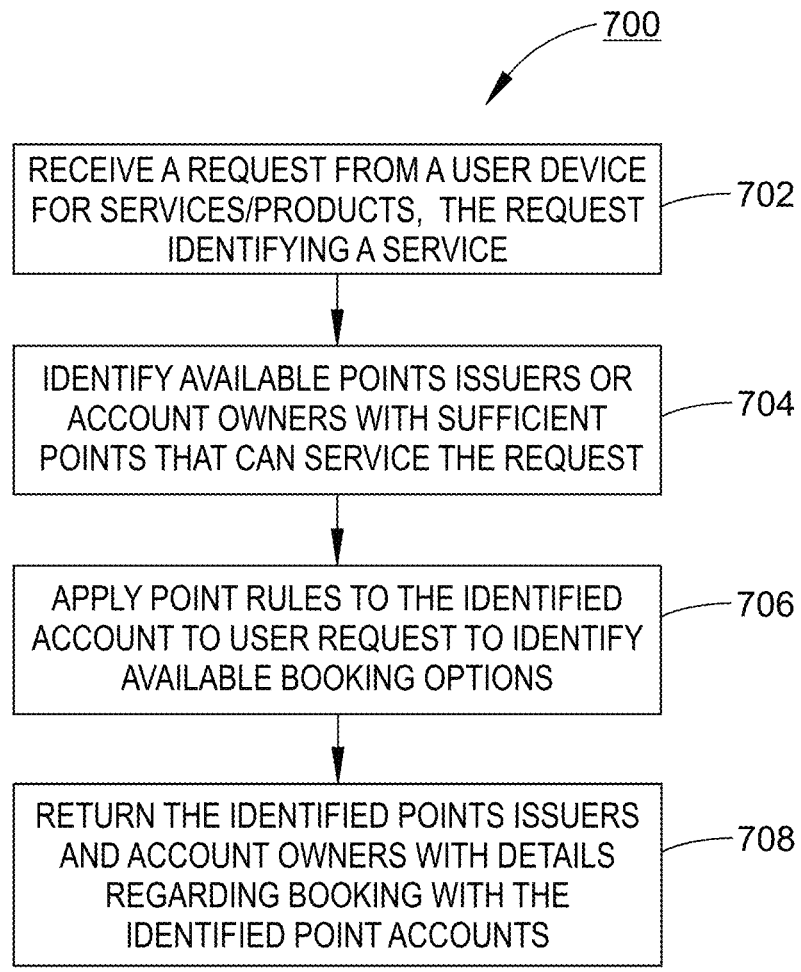
FIG. 7 is a flowchart illustrating a method for location-based secured transfer of a service associated with a loyalty point between mobile devices according to a server in accordance with one aspect of the exemplary embodiment
Figure 8:
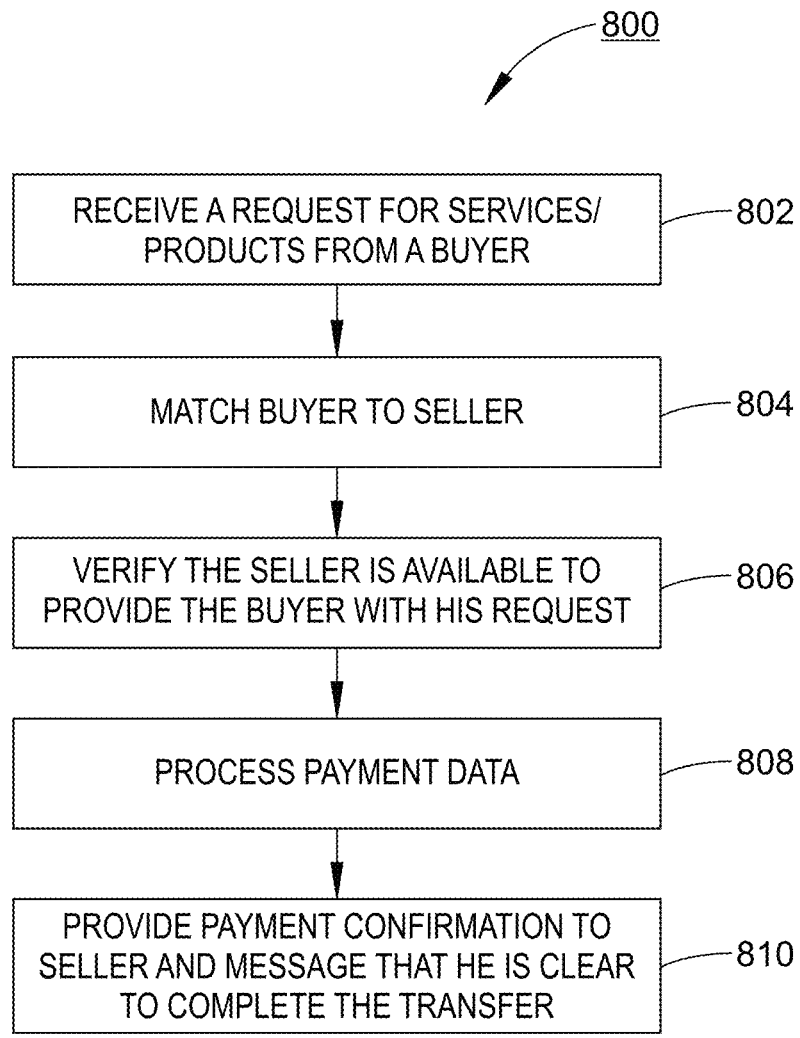
FIG. 8 is a flowchart illustrating a method for location-based secured transfer of a service associated with a loyalty point between mobile devices according to the server of FIGURE C in accordance with one aspect of the exemplary embodiment.
Figure 9:
FIG. 9 provides an illustration of a graphical user interface associated with interactions with the marketplace in accordance with an exemplary embodiment.

Operations of the server 102 are addressed with respect to FIGS. 7 and 8. FIG. 7 illustrates operations of the server 102 with respect to interactions with the first mobile device 300. FIG. 8 provides an illustration of the operations of the server 102 with respect to facilitating a transaction 168 between first mobile device 300 and the second mobile device 400. As shown in FIG. 7, the server 102 receives a request 130 from the first mobile device 300 for a service or product at 702. In accordance with one embodiment of the subject application, the request 130 further includes the location of the first mobile device 300, submitted either in the request 130 itself or received by the server 102 via login of the first mobile device 300 on the website 200 hosted by the server 102.

The server 102 then identifies, at 704, available loyalty points issuer(s) 128 and/or account owner(s) 126 respectively offering the service 132 and having sufficient loyalty points 133 capable of meeting the request 130. In some instances, the server 102 will analyze airline/hotel information 162, routes 166, and the like, to determine the appropriate service provider 150 and thereafter the corresponding loyalty points issuer 128 and account owner(s) 126. In one embodiment, the server 102 filters the available issuers 128 and/or account owner(s) 126 based upon the locations of such issuers 128 and account owners 126 relative to the location of the first mobile device 300. The server 102 then retrieves point rules 170 from the data storage 144 and analyzes the rules 170 (via the rules component 112) to apply the rules 170 to the identified account(s) 126 to identify available booking options responsive to the request 130, if applicable.

The server 102 then communicates, at 708, a response 131 to the request 130 via secure communications 188 with the first mobile device 300, either via the thin client 322 resident thereon, or directly via an application 320 resident on the first mobile device 300 facilitating secure communications 188 between the first mobile device 300 and the server 102. In some embodiments, the response 131 from the server 102 includes, for example and without limitation, information about the identified points issuers 128 and account owners 126 with details relating to the booking with the identified points accounts 126. That is, the server 102 communicates a list 131 to the first mobile device 300 that includes those points issuers/services providers 128, 150 and/or account owners 126 that not only are capable of fulfilling the request 130, but also are in proximate geographic location to the first mobile device 300. It will be appreciated that additional operations of the server 102 with respect to interaction thereof with the first mobile device 300 and/or the second mobile device 400 are discussed in greater detail above with respect to FIGS. 5 and 6.

Turning now to FIG. 8, operations of the server 102 with respect to facilitating a transaction 168 between the first mobile device 300 and the second mobile device 400 are illustrated therein. At 802, the server 102 receives a request 130 for services/products from the first mobile device 300. At 804, the server 102 matches the first mobile device 300 with a second mobile device 400 (as discussed in greater detail above). In accordance with varying embodiments, the server 102 may identify more than one additional mobile device (not shown) associated with a seller, wherein each identified seller has the same or differing loyalty points 133 that, when combined, are sufficient to procure the services for the user of the first mobile device 300. For example, the server 102 may identify the second mobile device 400 as having a portion of airline miles (i.e. loyalty points) necessary for a requested airline ticket (i.e., the service) and a third mobile device (not shown) having loyalty points 133 (e.g. credit card points/miles) different from the second mobile device 400, but which may be accepted by the service provider (e.g. airline) for providing the desired service, e.g., AMERICAN EXPRESS POINTS which may be converted to the same loyalty points 133 as those of the second mobile device 400 and which are accepted by the service provider.

The server 102 then verifies, at 806, that the account owner 126 associated with the second mobile device 400, i.e., the seller, is available to provide the account owner associated with the first mobile device 300, i.e., the buyer, the service/product associated with the request 130. In one embodiment, the server 102 may verify the respective locations of the devices 300, 400. In another embodiment, the server 102 may communicate directly with the account owner via the second mobile device 400 to ensure that the loyalty points 133 are still available, the owner 126 is willing to proceed with the transaction 168, or myriad other steps to verify the account owner 126 associated with the second mobile device 400 is capable of fulfilling the request 130.

In the example embodiment of FIG. 8, the server 102 processes payment data 164 received from the first mobile device 300 to the benefit of the account owner 126 of the second mobile device 400. Payment confirmation is then communicated to the second mobile device 400 by the server 102 at 810 via a message (SMS, MMS, email, instant messaging, proprietary or commercially available secure application resident on the device 400, etc.) indicating the account owner 126 associated with the second mobile device 400 is clear to complete the transfer to the first mobile device 300, procure the tickets (service 132), spend the loyalty points 133, transfer the loyalty points 133, etc. Thereafter, operations with respect to FIG. 8 terminate.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for transferring a service associated with a loyalty point to a first user device from a second user device, comprising:
    a server, comprising:
    a processor; and
    memory in communication with the processor, the memory storing instructions which are executed by the processor causing the processor to:
    receive a request from a first user device over a communications network, the request including first user identification information and a service request,
    identify at least one service provider accepting a loyalty point for fulfilling the service request,
    receive, from the first user device, location data corresponding to a geographical location associated with the requested service,
    identify at least one second user device in accordance with the received location data of the first user device and location data of the at least one second user device, the second user device having at least one of sufficient loyalty points to procure the requested service from the at least one identified service provider or an ability to generate sufficient loyalty points to procure the requested service from the at least one identified service provider, wherein the location data of the at least one service provider corresponds to a geographical location of the first user device, and
    establish a secure communications link between the first user device and the at least one identified second user device, wherein the loyalty points associated with the second user device are utilized to procure the requested service from the at least one identified service provider for the first user identification and wherein a value of the loyalty points from the at least one identified second user device to be used corresponds to a geographical proximity between the first user device and the at least one service provider,
    wherein the at least one second user device is associated with a points reseller, a points issuer or the service provider.

2. The system of claim 1, wherein the memory further comprises instructions which are executed by the processor, causing the processor to:
    identify a geographical location between the geographical location of the first user device and the geographical location of the at least one identified service provider; and
    communicate, via the secure communications link, the identified geographical location to the first user device and the at least one identified service provider.

3. The system of claim 2, wherein the at least one identified service provider is associated with the at least one identified loyalty program, and wherein the identified geographical location is a physical location of the at least one identified service provider.

4. The system of claim 2, wherein the memory further comprises instructions which are executed by the processor, causing the processor to:
    identify at least one loyalty point having an increased value in accordance with the geographical location of the first user device;

communicate, via a secure communications link, user identification information associated with the first user device to the at least one identified service provider associated with the at least one loyalty point having increased value; and identify the at least one service provider to the first user device.

5. The system of claim 1, wherein the memory further comprises instructions which are executed by the processor, causing the processor to:

track, in real time, a plurality of service transfers amongst users utilizing a plurality of loyalty points relative to an intermediate point;

determine, from the tracking, an exchange rate relating each of the plurality of loyalty points to the intermediate point in accordance with a track result;

determine, for each of the identified set of service providers, an amount of loyalty point respective to each of the identified set of service providers relative to the intermediate point in accordance with the exchange rate; and generate, via display of an associated user device, graphical indicia representative of each loyalty point relative to the intermediate point.

6. The system of claim 1, wherein the memory further comprises instructions which are executed by the processor, causing the processor to:

determine, from the identified service provider, personally identifiable data of the first user necessary to utilize the requested service;

generate, via the first user device, an encrypted data communique comprising the personally identifiable data of the first user; and communicate, via the secure communications link, the encrypted data communique of the personally identifiable data of the first user identification to the service provider.

7. The system of claim 1, wherein the memory further comprises instructions which are executed by the processor, causing the processor to:

determine, at least one combination of disparate loyalty points for procuring the requested service;

identify a combination of a plurality of user identifications differing from the first user identification having sufficient loyalty points associated therewith to combine to fulfill the requested service;

establish the secure communications link between the first user device and each user device corresponding to the combination of the plurality of user identifications, wherein the combination of disparate loyalty points are utilized to procure the requested service for the first user identification.

8. The system of claim 1, wherein the loyalty point is a virtual currency.

9. The system of claim 1, wherein the geographical proximity corresponds to a close physical proximity, wherein an image on a display of the first user device is capable of being scanned by the at least one identified service provider.

10. The system of claim 9, wherein the image displayed on the display of the first user device is a QR code.

11. The system of claim 1, wherein the secure communications link is a near-field communication link.

12. A method for transferring a service associated with a loyalty point to a first user device from a second user device, the method comprising:

receiving a request via a web site hosted by a server over a communications network from a first user device, the request including first user identification information and a service request;

identifying at least one service provider accepting a loyalty point for fulfilling the service request;

receiving, from the first user device, location data corresponding to a geographical location associated with the service request;

identifying at least one second user device in accordance with the received location data of the first user device and location data of the at least one second user device, the second user device having at least one of sufficient loyalty points to procure the requested service from the at least one identified service provider or an ability to generate sufficient loyalty points to procure the requested service from the at least one identified service provider, wherein the location data of the at least one service provider corresponds to a geographical location of the first user device;

directing the first user device and the second user device to a meeting location different from the location of the first user device and the location of the second user device;

establishing a secure communications link between the first user device associated with the first user identification and the second user device associated with the meeting location to procure the requested service from the at least one identified service provider and a value of the loyalty points from the second user device to be used corresponding to a geographical proximity between the first user device and the at least one service provider;

utilizing, in accordance with the secure communications link, the loyalty points by the second user identification via the second user device to procure the requested service for use by the first user identification; and communicating, via the secured communications link, confirmation data indicative of the procurement of the requested service from the second user device to the first user device, and wherein the at least one second user device is associated with a points reseller, a points issuer or the service provider.

13. The method of claim 12, wherein identifying the at least one service provider further comprises identifying a set of service providers providing services meeting one or more requirements included in the received request.

14. The method of claim 13, wherein establishing a secure communications link further comprises:

determining, from the identified service provider, personally identifiable data of the first user necessary to utilize the requested service;

generating, via the first user device, an encrypted data communique comprising the personally identifiable data of the first user; and communicating, via the secure communications link, the encrypted data communique of the personally identifiable data of the first user identification to the second user device.

15. The method of claim 12, further comprising:

tracking, in real time, a plurality of service transfers amongst users utilizing a plurality of loyalty points relative to an intermediate point;

determining, from the tracking, an exchange rate relating each of the plurality of loyalty points to the intermediate point;

determining, for each of the identified set of service providers, an amount of loyalty point respective to each of the identified set of service providers relative to the intermediate point in accordance with the exchange rate; and generating, via display of an associated user device, graphical indicia representative of each loyalty point relative to the intermediate point.

16. The method of claim 12, wherein the secure communications link is a near-field communications link.

17. A system for transferring a service associated with a loyalty point to a first user device from a second user device, comprising:

a server, comprising:

a processor; and memory in communication with the processor, the memory storing instructions which are executed by the processor causing the processor to:

receive a request from a first user device over a communications network, the request including first user identification information, a geographical location of the first user device, and a service request, identify at least one service provider accepting a loyalty point for fulfilling the service request, identify at least one second user device having at least one of sufficient loyalty points to procure the requested service from the at least one identified service provider or an ability to generate sufficient loyalty points to procure the requested service from the at least one identified service provider, establish a secure communications link between the first user device and the at least one identified second user device, wherein the loyalty points associated with the at least one identified second user device are utilized to procure the requested service from the at least one identified service provider for the first user identification and wherein a value of the loyalty points from the at least one identified second user device to be used corresponds to a proximity between the first user device and the at least identified service provider;

receive, from the first user device, location data corresponding to a geographical location of the requested service;

identify the at least one second user device in accordance with the received location data of the first user device and corresponding location data of the at least one identified service provider;

identify a geographical location between the geographical location of the first user device and a geographical location of the at least one identified second user device;

communicate, via the secure communications link, the identified geographical location to the first user device and the at least one identified second user device;

track, in real time, a plurality of service transfers amongst users utilizing a plurality of loyalty points relative to an intermediate point;

determine, from the tracking, an exchange rate relating each of the plurality of loyalty points to the intermediate point in accordance with a track result;

determine, for each of the identified set of service providers, an amount of loyalty point respective to each of the identified set of service providers relative to the intermediate point in accordance with the exchange rate; and generate, via display of an associated user device, graphical indicia representative of each loyalty point relative to the intermediate point, wherein the secure communications link is established between the first user device and the at least one identified second user device at the geographical location identified between the geographical location of the first user device and the geographical location of the at least one identified second user device, and wherein the at least one second user device is associated with a points reseller, a points issuer or the service provider.

* * * * *